US007711498B2

(12) United States Patent
Hiramatsu

(10) Patent No.: US 7,711,498 B2
(45) Date of Patent: May 4, 2010

(54) GLOW PLUG DEGRADATION DETERMINATION DEVICE

(75) Inventor: Hiromi Hiramatsu, Kariya (JP)

(73) Assignee: Denso Corporation, Kariya (JP)

( * ) Notice: Subject to any disclaimer, the term of this patent is extended or adjusted under 35 U.S.C. 154(b) by 44 days.

(21) Appl. No.: 12/173,272

(22) Filed: Jul. 15, 2008

(65) Prior Publication Data

US 2009/0037120 A1 Feb. 5, 2009

(30) Foreign Application Priority Data

Aug. 1, 2007 (JP) ............................ 2007-201030

(51) Int. Cl.
*G01B 7/00* (2006.01)

(52) U.S. Cl. ....................... 702/34; 702/53; 123/143 R; 123/145 A

(58) Field of Classification Search .................. 702/34, 702/53; 123/145 A, 143 R; 324/378
See application file for complete search history.

(56) References Cited

U.S. PATENT DOCUMENTS 4,260,985 A * 4/1981 Hayden ..................... 340/635
4,360,765 A * 11/1982 Kubota et al. ........... 315/209 M
4,500,775 A * 2/1985 Sangu et al. ................ 219/497
6,414,273 B1 * 7/2002 Taniguchi et al. ........... 219/270

FOREIGN PATENT DOCUMENTS

JP 11-182400 7/1999
JP 2002-276524 9/2002

* cited by examiner

*Primary Examiner*—Drew A Dunn
*Assistant Examiner*—Hien X Vo
(74) *Attorney, Agent, or Firm*—Nixon & Vanderhye PC

(57) ABSTRACT

A glow plug degradation determination device energizes a glow plug immediately after an operation of an internal combustion engine is stopped. When a preset energization time elapses, the device senses a sensing value corresponding to resistance of the glow plug. The device determines degradation of the glow plug based on the sensing value. When the device determines that the glow plug is degraded, the device stores a result of the determination and reports the degradation of the glow plug before a next start. The device provisionally determines the degradation of the glow plug based on the sensing value during the operation of the internal combustion engine. After the device provisionally determines the degradation to be present, the device determines the degradation of the glow plug immediately after the operation of the internal combustion engine is stopped.

13 Claims, 13 Drawing Sheets

GLOW PLUG DEGRADATION DETERMINATION DEVICE

CROSS REFERENCE TO RELATED APPLICATION

This application is based on and incorporates herein by reference Japanese Patent Application No. 2007-201030 filed on Aug. 1, 2007.

BACKGROUND OF THE INVENTION

1. Field of the Invention

The present invention relates to a glow plug degradation determination device that determines degradation of a glow plug of an internal combustion engine.

2. Description of Related Art

As a device for detecting a breakage abnormality in a glow plug of an internal combustion engine, there is a known device that senses voltage upstream of a glow plug and voltage downstream of the glow plug and determines a breakage in the glow plug based on a difference between the sensed voltages, e.g., as described in Patent document 1: JP-A-H11-182400. There is also a known device that has a dedicated circuit for detecting a breakage of a glow plug and that detects the breakage of the glow plug by comparing an electric potential in a series circuit including the glow plug with a reference electric potential corresponding to voltage of a power supply, e.g., as described in Patent document 2: JP-A-2002-276524.

For example, as shown in FIG. 15, a glow plug having a ceramic heater has a tip end, in which a U-shaped ceramic resistive element 100 is placed in a ceramic base 102. The ceramic resistive element 100 is formed of a conductive ceramic, which is made by bonding tungsten carbide (WC) grains with a grain boundary material (Si—Yb—O—N) as a grain boundary glass layer, for example. The ceramic base 102 is formed of an insulating ceramic, which is made by bonding grains including silicon nitride ($Si_3N_4$) as a main ingredient with a grain boundary material (Si—Yb—O—N) as a grain boundary glass layer, for example.

As the glow plug is used for a longer period, the grain boundary material $Yb^+$ on a positive electrode side is diffused to a negative electrode side by a migration effect due to a heat load in the ceramic resistive element 100. As a result, fixing strength of the tungsten carbide (WC) is lowered and the positive electrode side of the ceramic resistive element 100 becomes porous, thereby increasing resistance of the ceramic resistive element 100.

As shown in FIG. 16, the heater temperature THG of the glow plug decreases if the resistance value R of the glow plug increases. In such the case, preheating of an internal combustion engine cannot be performed sufficiently, causing increase of hydrocarbon (HC) and carbon monoxide (CO) in exhaust gas. In a glow plug having a metal heater, the resistance is lowered by degradation due to a heat load.

Conventional devices can detect a breakage of a glow plug but cannot accurately detect degradation of the glow plug, which causes change in resistance of the glow plug. That is, since the detection is performed during an operation of the internal combustion engine, the glow plug is cooled by an intake air, an exhaust gas or a fuel spray. Therefore, it has been difficult to accurately detect the degradation even if the resistance is sensed during the operation of the internal combustion engine.

SUMMARY OF THE INVENTION

It is an object of the present invention to provide a glow plug degradation determination device capable of accurately determining degradation of a glow plug.

According to an aspect of the present invention, a glow plug degradation determination device has a sensing device and a determining device. The sensing device energizes a glow plug provided for preheating an internal combustion engine and thereby sensing a sensing value corresponding to resistance of the glow plug. The determining device energizes the glow plug immediately after an operation of the internal combustion engine is stopped and determines degradation of the glow plug based on the sensing value sensed with the sensing device.

According to another aspect of the present invention, the determining device energizes the glow plug immediately after the operation of the internal combustion engine is stopped and determines the degradation of the glow plug when a preset energization time of the energization elapses.

According to another aspect of the present invention, the determining device energizes the glow plug with an energization voltage equal to or lower than a rated voltage of the glow plug.

According to another aspect of the present invention, the glow plug degradation determination device further includes a coolant temperature sensing device for sensing coolant temperature of a coolant of the internal combustion engine. The determining device varies the energization voltage for energizing the glow plug in accordance with the coolant temperature sensed with the coolant temperature sensing device.

According to another aspect of the present invention, when the determining device determines that the glow plug is degraded, the determining device stores a result of the determination and reports the degradation of the glow plug before a next start of the internal combustion engine.

According to another aspect of the present invention, the determining device is prohibited from performing the determination until a preset time elapses after performing the determination even if the internal combustion engine is started and the operation thereof is stopped again.

According to another aspect of the present invention, the glow plug degradation determination device further includes a provisionally determining device for provisionally determining the degradation of the glow plug based on the sensing value sensed with the sensing device during the operation of the internal combustion engine. After the provisionally determining device provisionally determines the degradation to be present, the determining device determines the degradation of the glow plug immediately after the operation of the internal combustion engine is stopped.

According to another aspect of the present invention, the glow plug degradation determination device further includes a rotation speed sensing device for sensing rotation speed of the internal combustion engine and a provisionally determining device for provisionally determining degradation of the glow plug based on fluctuation in the rotation speed sensed with the rotation speed sensing device during the operation of the internal combustion engine. After the provisionally determining device provisionally determines the degradation to be present, the determining device determines the degradation of the glow plug immediately after the operation of the internal combustion engine is stopped.

According to another aspect of the present invention, the provisionally determining device performs the provisional determination when the operation of the internal combustion engine is stable.

According to another aspect of the present inventions the provisionally determining device performs the provisional determination within an afterglow time.

According to another aspect of the present invention, the determining device determines the degradation of the glow plug immediately after the operation of the internal combustion engine is stopped even when the provisionally determining device cannot perform the provisional determination within the afterglow time.

According to another aspect of the present invention, the determining device energizes the glow plug when the internal combustion engine is stopped for idle stop and determines the degradation of the glow plug based on the sensing value sensed with the sensing device.

According to yet another aspect of the present invention, after the determining device performs the determination immediately after the internal combustion engine is stopped for the idle stop, the determining device is prohibited from performing the determination even if the operation of the internal combustion engine is stopped again.

The glow plug degradation determination device according to one of the above aspects of the present invention determines the degradation of the glow plug immediately after the operation of the internal combustion engine is stopped. Therefore, the degradation can be accurately determined without being affected by cooling due to intake air, exhaust gas or a fuel spray or by lowering of temperature of a coolant. Further, since the determination is started when the internal combustion engine is still warm, the determination can be performed with low power.

In the case where the device performs the determination of the degradation when a preset energization time elapses immediately after the operation of the internal combustion engine is stopped as in one of the above aspects of the present invention, the device can perform the determination accurately. Moreover, in the case where the device energizes the glow plug with the energization voltage equal to or lower than the rated voltage of the glow plug as in one of the above aspects of the present invention, the device can perform the determination with low power and inhibit shortening of a lifetime of the glow plug due to the determination. In the case where the device varies the energization voltage according to the coolant temperature of a coolant as in one of the above aspects of the present invention, the device can perform the determination with low power and inhibit the shortening of the lifetime of the glow plug due to the determination.

In the case where the device reports the degradation of the glow plug before the next start when the device determines that the glow plug is degraded as in one of the above aspects of the present invention, a driver can be informed of the degradation before the start. In the case where the device prohibits the determination until a preset time elapses after performing the determination even if the operation is stopped next time as in one of the above aspects of the present invention, the device can inhibit consumption of a power supply battery in a vehicle such as a delivery vehicle, which repeats stoppage and operation, due to repetition of energization for the determination.

Further, in the case where the device has a provisionally determining device and determines the degradation with the determining device after provisionally determining the degradation to be present as in one of the above aspects of the present invention, it is made unnecessary to perform the energization and the determination with the determining device every time. As a result, the shortening of the lifetime of the glow plug can be inhibited. In the case where the device performs the provisional determination when the internal combustion engine is in a stable operation as in one of the above aspects of the present invention, the device can improve the accuracy of the provisional determination. Further, in the case where the device performs the provisional determination within an afterglow time as in one of the above aspects of the present invention, shortening of the lifetime of the glow plug can be inhibited. In the case where the device performs the determination of the degradation with the determining device without lengthening the afterglow time when the device cannot perform the provisional determination within the afterglow time as in one of the above aspects of the present invention, shortening of the lifetime of the glow plug can be inhibited and deterioration of fuel consumption can be inhibited.

In the case where the device performs the determination of the degradation with the determining device when the internal combustion engine is stopped for idle stop as in one of the above aspects of the present invention, the device can perform the determination of the degradation and improve restart performance through the energization to the glow plug. In the case where the device is prohibited from performing the determination of the degradation even if the operation is stopped when the idle stop is repeated as in one of the above aspects of the present invention, shortening of the lifetime of the glow plug can be inhibited.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
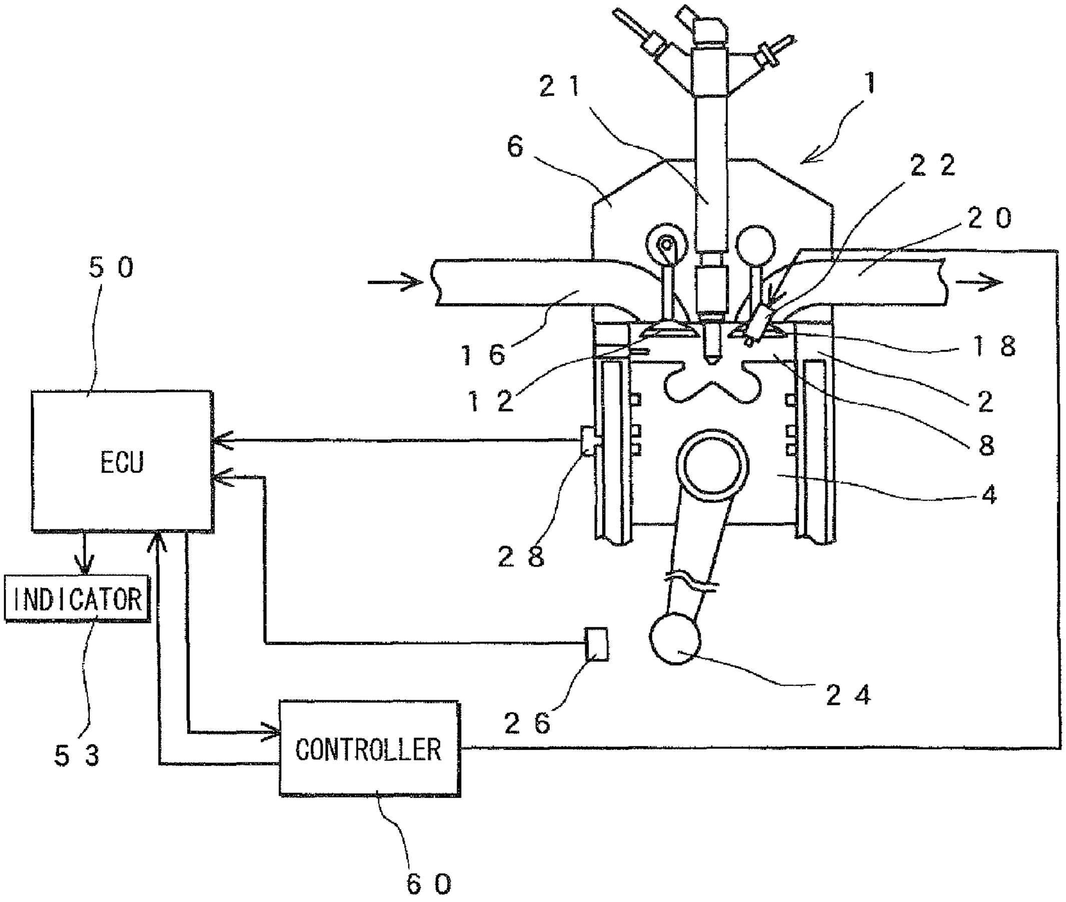
FIG. 1 is a schematic diagram showing an internal combustion engine for a vehicle applied with a glow plug degradation determination device according to an embodiment of the present invention.

Hereafter, an embodiment of the present invention will be described with reference to the drawings. FIG. 1 is a schematic structure diagram showing an internal combustion engine for a vehicle applied with a glow plug degradation determination device according to the embodiment. As shown in FIG. 1, the internal combustion engine 1 is a multi-cylinder diesel engine (in the example of FIG. 1, a four-cylinder diesel engine). In the engine 1, a combustion chamber 8 is constructed of a cylinder 2, a piston 4, and a cylinder head 6.

An air intake system of the internal combustion engine 1 is provided with an intake airflow passage 16 communicating with the combustion chamber 8 through an intake valve 12. An exhaust system of the internal combustion engine 1 is provided with an exhaust flow passage 20 communicating with the combustion chamber 8 through an exhaust valve 18.

An injector 21 for injecting fuel into the combustion chamber 8 is provided in the cylinder head 6 so that the injector 21 protrudes into the combustion chamber 8. The injector 21 is supplied with high-pressure fuel. Further, each combustion chamber 8 is provided with a glow plug 22 for warming an interior of the combustion chamber 8.

When the fuel is injected from the injector 21 into the combustion chamber 8, the fuel causes self-ignition due to compression of the combustion chamber 8, and an energy is produced by the combustion of the fuel. The energy is taken out as a rotational energy of a crankshaft 24 of the internal combustion engine 1 through the piston 4. In order to suppress rise in temperature of the internal combustion engine 1 due to the combustion of the fuel, a coolant is supplied to each cylinder 2 and the like to cool the cylinder 2 and the like.

A sensing system of the internal combustion engine 1 includes a rotation speed sensor 26 for sensing rotation speed of the internal combustion engine 1 according to rotation of a camshaft (not shown), which rotates once while the crankshaft 24 rotates twice, and a coolant temperature sensor 28 for sensing temperature THW of the coolant.

An electronic control unit 50 (hereafter, referred to as an ECU 50) controls output characteristics (output torque, exhaust characteristics) of the internal combustion engine 1 by operating various actuators such as the injectors 21 based on sensing values of various sensors that sense operating states of the internal combustion engine 1 and requests of a driver. Specifically, the ECU 50 controls a temperature state of the glow plug 22 through a controller 60. Further, the ECU 50 determines degradation of the glow plug 22 through the controller 60. When the degradation of the glow plug 22 is determined, the ECU 50 indicates the degradation in an indicator 53.

Figure 2:
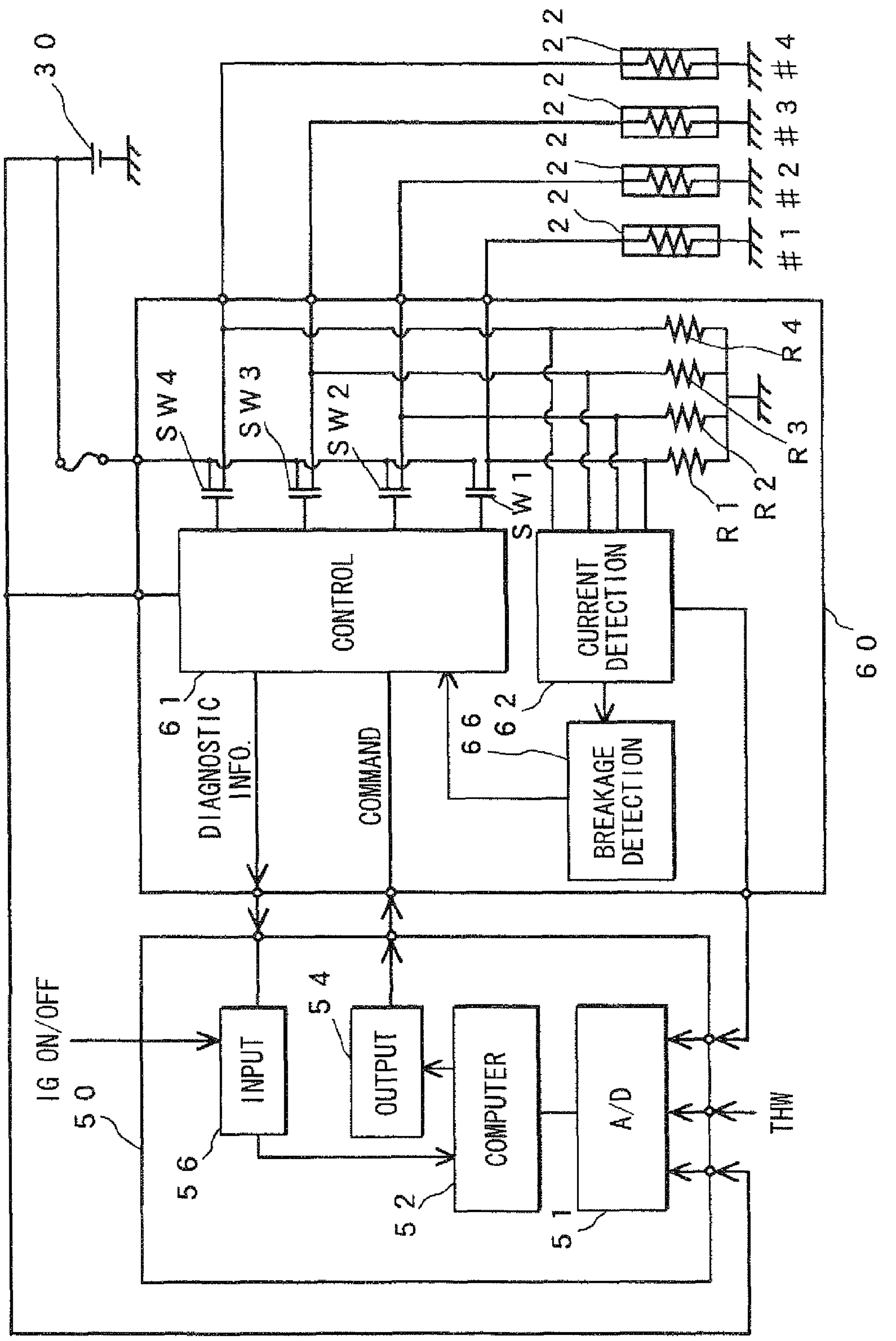
FIG. 2 is a block diagram showing an ECU and a controller according to the embodiment.

FIG. 2 is a block diagram showing a configuration of the ECU 50 and the controller 60. The internal combustion engine 1 according to the embodiment is a four-cylinder engine. Therefore, as shown in FIG. 2, four glow plugs 22 are provided for the respective cylinders. In order to provide and break continuity between a battery 30 and the glow plugs 22, the controller 60 is provided with switching elements SW1-SW4 each constructed of a MOS transistor.

A control circuit 61 operates conduction control terminals (gates) of the switching elements SW1-SW4 based on a command signal from the ECU 50 to control conduction states of the switching elements SW1-SW4.

The glow plugs 22 of the respective cylinders are connected with resistive elements R1-R4 in parallel. Voltage drop amounts due to the resistive elements R1-R4 are taken into a current detection circuit 62. The current detection circuit 62 senses amounts of currents passing through the glow plugs 22 of the respective cylinders as sensing values based on the voltage drop amounts. The sensing values are outputted to the ECU 50 and a breakage detection circuit 66.

The ECU 50 indirectly senses the temperature of the glow plug 22 of each cylinder based on the current flowing through the glow plug 22 of the cylinder. Since a resistance value R of the glow plug 22 has temperature dependence, the temperature THG of the glow plug 22 can be indirectly sensed based on the relationship therebetween. That is, the resistance value R of the glow plug 22 increases as the temperature THG of the glow plug 22 increases. More specifically, the resistance value R of the glow plug 22 is calculated from a value of voltage applied to the glow plug 22 and a value of the current flowing through the glow plug 22, and then the temperature THG of the glow plug 22 is indirectly sensed based on the resistance value R.

If the value of the current flowing through the glow plug 22 is sensed as a sensing value when the voltage applied to the glow plug 22 is constant, the sensing value corresponds to the resistance value R. If the value of the voltage applied to the glow plug 22 is sensed as a sensing value when the value of the current flowing through the glow plug 22 is controlled to be constant, the sensing value corresponds to the resistance value R. When both of the voltage value and the current value fluctuate, the voltage value and the current value of the glow plug 22 may be sensed as the sensing values to calculate the resistance value R.

The breakage detection circuit 66 detects existence/nonexistence of a breakage abnormality in a closed-loop circuit including the glow plug 22 of each cylinder based on whether the current flows through the glow plug 22. The detection result of the breakage is outputted as diagnostic information to the ECU 50 through the control circuit 61.

The ECU 50 takes in a signal related to the temperature THG of the glow plug 22, an output signal of the coolant temperature sensor 28 and a voltage value of the battery 30. The ECU 50 converts the signals and the value into digital data with an A/D converter 51. Digital data outputted by the A/D converter 51 is taken into a microcomputer 52. The microcomputer 52 generates the command signal based on the input data and outputs the command signal to the controller 60 through an output circuit 54. The diagnostic information outputted by the controller 60 and a state of an ignition switch IG are taken into the microcomputer 52 through an input circuit 56.

Figure 3:
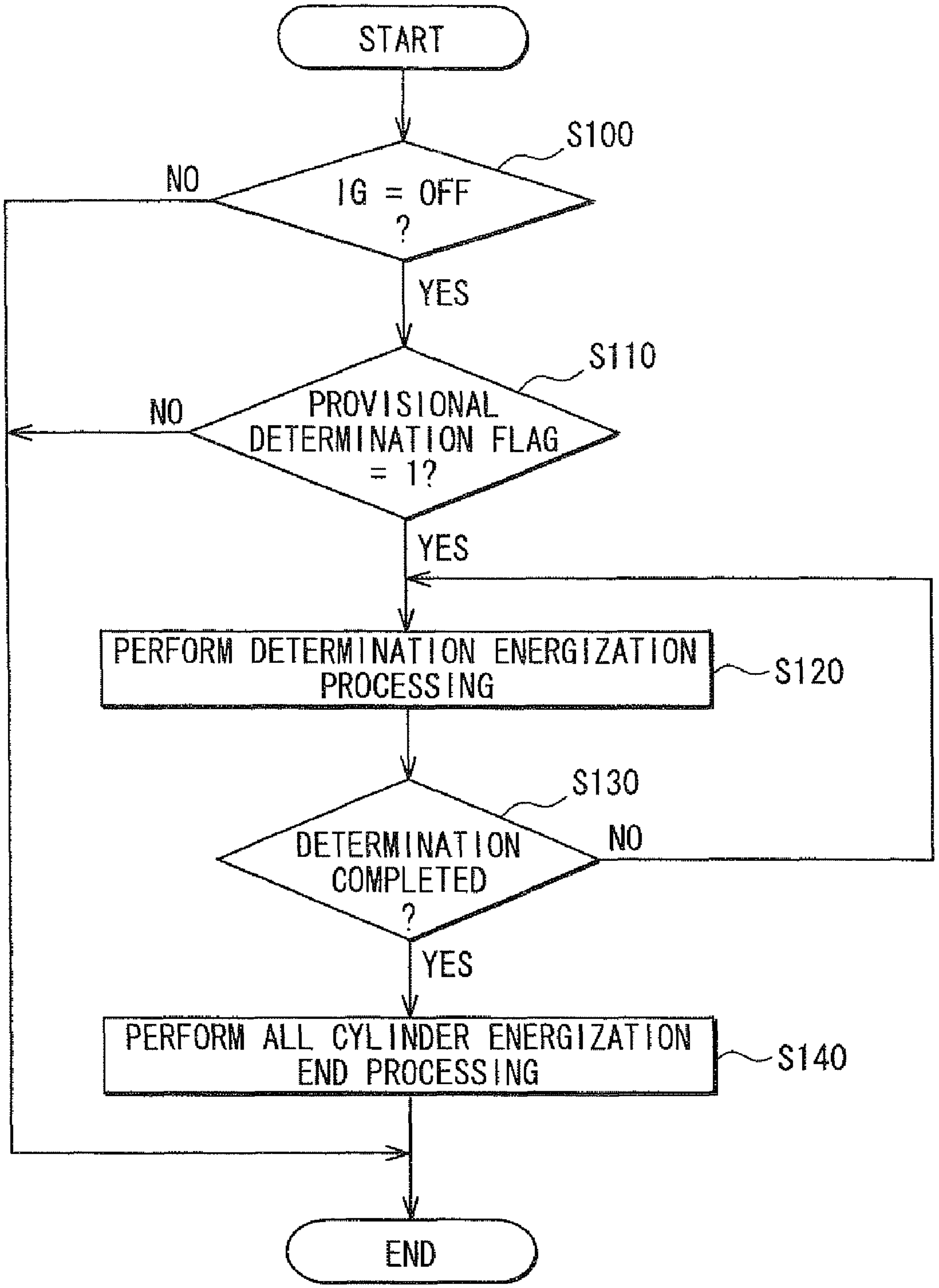
FIG. 3 is a flowchart showing an example of determination processing performed by the ECU according to the embodiment.

FIG. 3 is a flowchart showing an example of determination processing performed by the ECU 50 according to the embodiment. The determination processing is performed at a predetermined time interval by interrupt. As shown in FIG. 3, first in S100 (S denotes Step), it is determined whether the ignition switch IG has been turned off. If the ignition switch IG has not been operated (S100: NO) and the operation of the internal combustion engine 1 is continued, the determination processing is ended once.

When it is determined that the operation of the internal combustion engine 1 is stopped by operating the ignition switch IG and that the ignition switch IG has been turned off (S100: YES), it is determined whether a provisional determination flag is set at 1 in S110. The provisional determination flag is set by provisional determination processing described later. When it is determined that the provisional determination flag is not set at 1 (S110: NO), the determination processing is ended once.

When it is determined that the provisional determination flag is set at 1 (S110: YES), determination energization processing described later is performed in S120. Then, it is determined whether determination of degradation of each glow plug 22 has been completed in S130. When it is determined that the determination has not been completed (S130: NO), the determination energization processing (S120) is repeated. When it is determined that the determination has been completed (S130: YES), the energization of the glow plugs 22 of all the cylinders is ended in S140. After the energization is ended, the determination processing is ended once.

Figure 4:
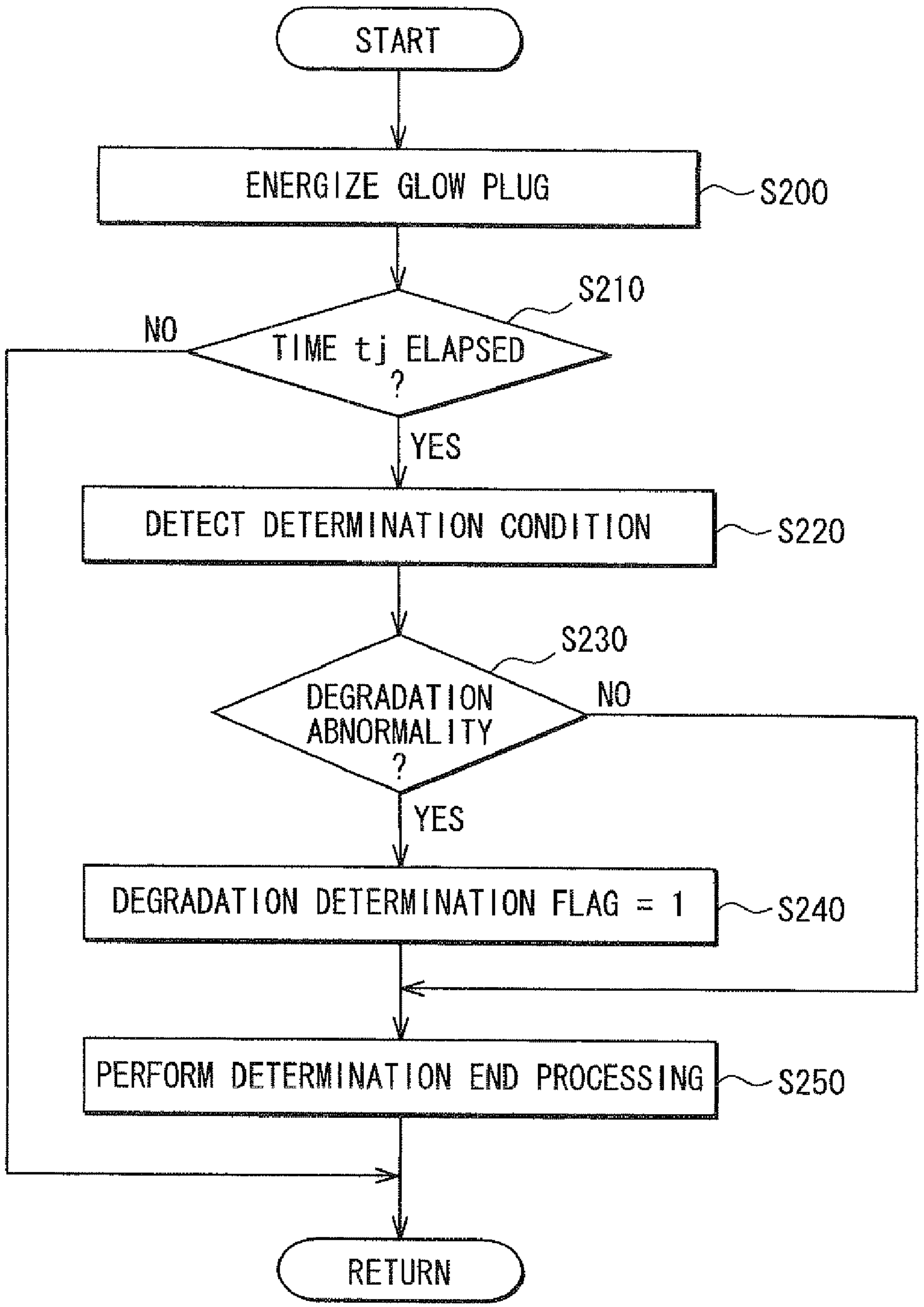
FIG. 4 is a flowchart showing an example of determination energization processing performed by the ECU according to the embodiment.

FIG. 4 is a flowchart showing an example of the determination energization processing (S120) performed by the ECU 50 according to the embodiment. In the determination energization processing (S120); first in S200; processing of energizing the glow plugs 22 is performed. In the energization, the control circuit 61 brings the switching elements SW1-SW4 into conduction states based on a command signal from the ECU 50 and applies, for example, rated voltage of the glow plugs 22 to the glow plugs 22 to energize the same. As a result, the glow plugs 22 produce heat.

Figure 10:
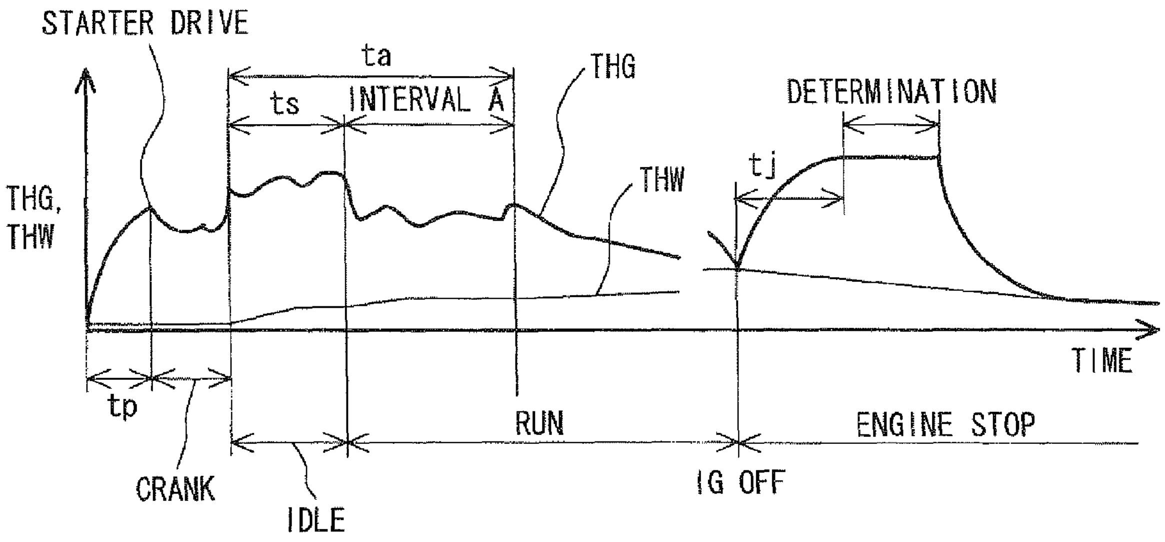
FIG. 10 is a time chart showing transitions of glow plug temperature and coolant temperature according to the embodiment.

After the glow plugs 22 are energized, it is determined in S210 whether an energization time tj has elapsed after the start of energization. As shown in FIG. 10, the internal combustion engine 1 is warmed by the heat produced by energizing the glow plugs 22. At this time, the internal combustion engine 1 is in an operation stoppage state, and therefore, air supply, gas exhaust, or fuel injection is not performed. Accordingly, heat radiation other than natural heat radiation does not occur, and change in the temperature THW of the coolant is small. As time passes, an equilibrium state in which the change in the temperature is small is established. Immediately after the ignition switch IG is turned off and the operation of the internal combustion engine 1 is stopped, the internal combustion engine 1 is still warm. The glow plugs 22 are also warm, and the coolant temperature THW of the coolant is also high.

Therefore, the time until the equilibrium state is established is short. The energization time tj until the equilibrium state is established is obtained by experiment or the like and set beforehand. A relationship between the coolant temperature THW of the coolant and the energization time tj may be stored, and the energization time tj may be set according to the coolant temperature THW sensed with the coolant temperature sensor 28. Instead of applying the rated voltage to the glow plugs 22, a voltage lower than the rated voltage may be applied to the glow plugs 22.

When it is determined that the energization time tj has not elapsed (S210: NO), the process returns to the determination processing of FIG. 3. Then, it is determined in S130 that the determination has not been completed (S130: NO), and the processing of S200 and the following steps is repeated.

Figure 11:
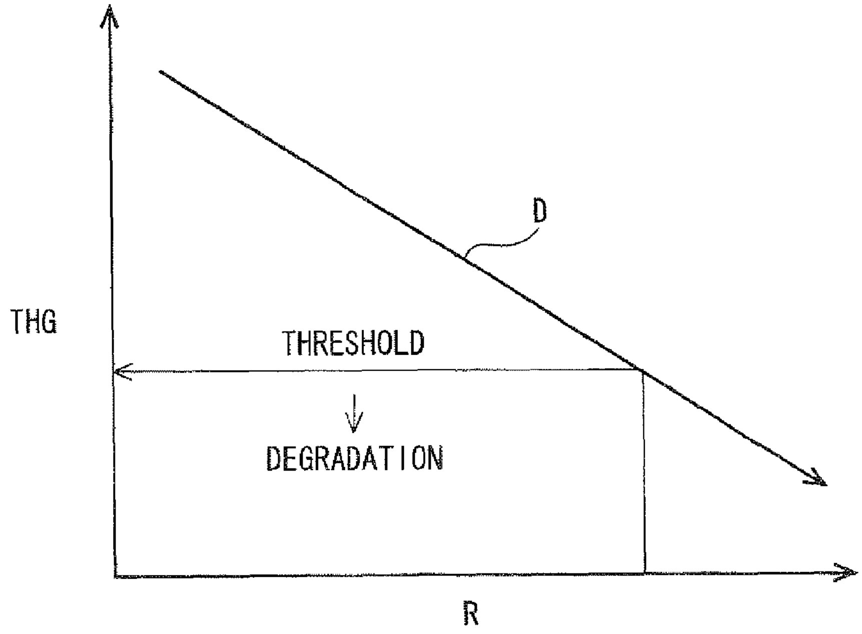
FIG. 11 is a graph showing a relationship between temperature and resistance of a glow plug according to the embodiment.

When it is determined that the energization time tj has elapsed (S210; YES), it is determined that the temperature THG of the glow plugs 22 has substantially reached the equilibrium state and a determination condition is detected in S220. As mentioned above, the resistance value R of the glow plug 22 having a ceramic heater increases as the glow plug 22 is degraded more. If the resistance value R increases, the temperature THG of the glow plug 22 as the result of energization decreases. As shown in FIG. 11, a state in which the temperature THG is lower than a threshold value indicates a state in which the glow plug 22 has been degraded. The characteristic of the glow plug 22 changes in a direction shown by an arrow mark D in FIG. 11 as the degradation of the glow plug progresses.

As the degradation determination condition, a value of current flowing through the glow plug 22 is sensed with the current detection circuit 62 as a sensing value when the glow plug 22 is energized by the processing of S200. A small sensing value indicates that the resistance value R is high and the glow plug 22 has been degraded. That is, if the current value is sensed as a sensing value when a constant voltage is applied to the glow plug 22, the sensing value is inversely proportional to the resistance value R.

After the sensing, it is determined in S230 whether the glow plug 22 is degraded (in interval DETERMINATION shown in FIG. 10). It is determined that the resistance value R is high and the glow plug 22 is degraded if the sensing value is smaller than a predetermined threshold value.

When it is determined that the glow plug 22 is degraded, a degradation determination flag is set to 1 in S240 and determination end processing is performed in S250. It is determined whether each glow plug 22 is degraded. In the determination end processing, the degradation determination flag is set to 1 for the glow plug 22 of the cylinder determined to be degraded and the number or the like indicating the cylinder having the degraded glow plug 22 is stored. When it is determined that the glow plugs 22 are not degraded, the determination end processing is performed and the process returns to the original determination processing. 0 is beforehand set as an initial value of the degradation determination flag.

As described above, in the embodiment, the glow plugs 22 are energized immediately after the operation of the internal combustion engine 1 is stopped, and the degradation of the glow plug 22 is determined based on the current value as a sensing value at that time. Immediately after the operation of the internal combustion engine 1 is stopped, the internal combustion engine 1 and the glow plugs 22 are still warm and the coolant temperature THW of the coolant is also high. The internal combustion engine 1 is in the stopped state and the air supply, the gas exhaust, or the fuel injection is not performed. Therefore, the equilibrium state in which the change in the temperature is small is reached in a short time.

Accordingly, the degradation determination of the glow plugs 22 can be performed correctly since the degradation determination is less prone to be influenced by the lowering of the coolant temperature THW. Since the internal combustion engine 1 and the glow plugs 22 are warm, the energization time tj to the equilibrium state may be short. Therefore, a load on the battery 30 can be reduced and determination can be performed with a low power.

Figure 5:
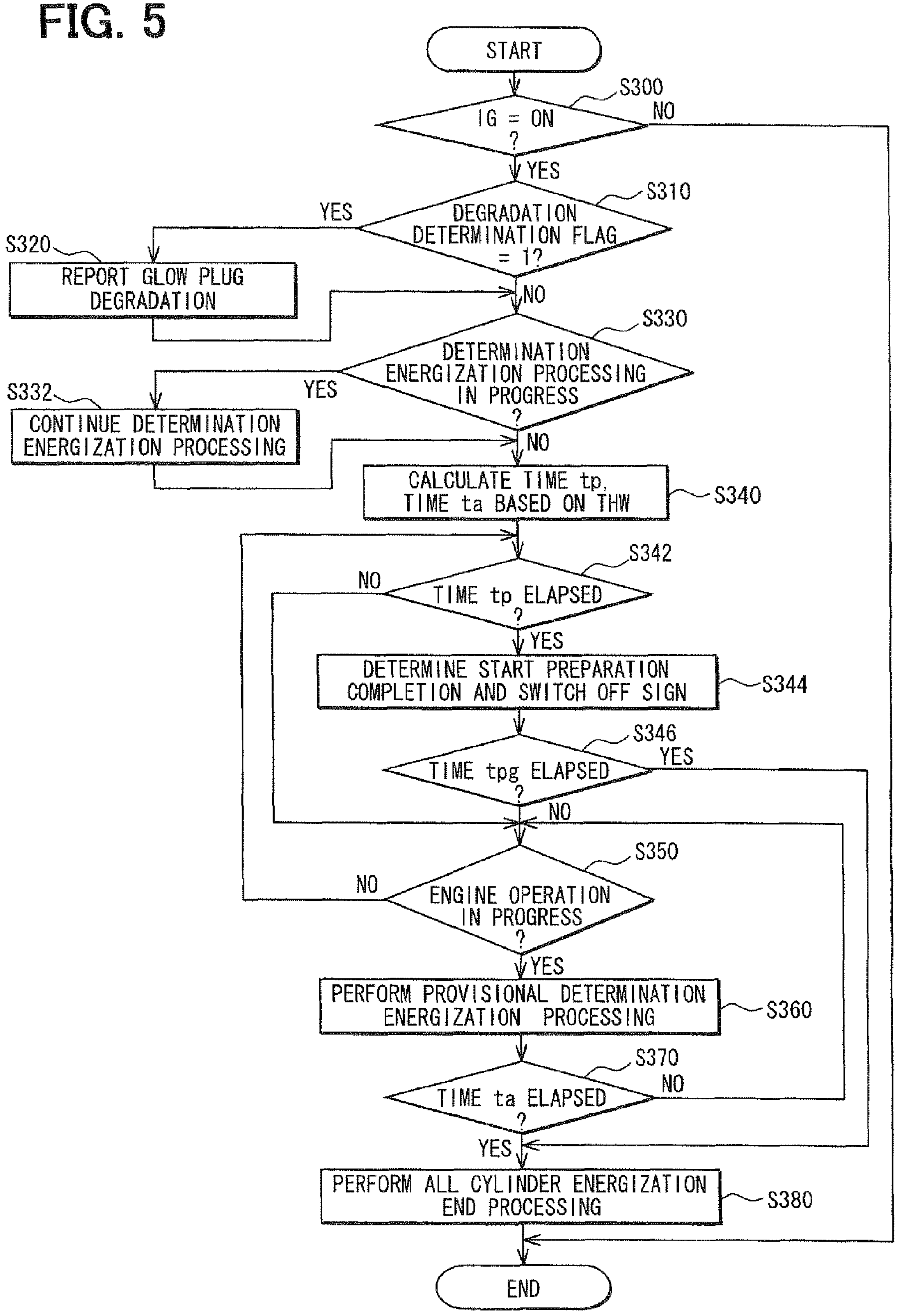
FIG. 5 is a flowchart showing an example of provisional determination processing performed by the ECU according to the embodiment.

Next, provisional determination processing for setting the above-mentioned provisional determination flag will be described with reference to FIG. 5. In the provisional determination processing, first in S300, it is determined whether the ignition switch IG is on. When the ignition switch IG is not operated and remains off (S300: NO), the provisional determination processing is immediately terminated. When the ignition switch IG is operated and switched on (S300: YES), it is determined in S310 whether the degradation determination flag is set at 1.

The degradation determination flag is set to 1 by the above-mentioned processing of S240 when the glow plug 22 is degraded. When the degradation determination flag is set at 1 (S310: YES), it is indicated in the indicator 53 that the glow plug 22 is degraded together with the number of the corresponding cylinder or the like in S320.

Since the above-mentioned determination processing is performed after the internal combustion engine 1 is stopped, the result of the determination processing cannot be reported to the driver by the indication on the indicator 53 or the like in the determination processing. In order to cope with this, the result of the determination is stored once by the above-mentioned processing of S250 and the determination result is reported to the driver before the operation of the internal combustion engine 1 is started. Thus, the driver can be informed of the result of the determination before the driver starts the operation of the internal combustion engine 1.

When the degradation determination flag is not set at 1 (S310; NO) or after the degradation of the glow plug 22 is reported (S320), it is determined whether the above-mentioned determination energization processing after the operation of the internal combustion engine 1 is stopped is in progress in S330. When the ignition switch IG is turned on again immediately after the internal combustion engine 1 is stopped, there is a possibility that the above-mentioned determination processing is in the progress. When the determination energization processing is in progress (S330: YES), the execution of the determination energization processing is continued in S332.

When the determination energization processing is not in progress (S330; NO) or while the execution of the determination energization processing is continued, energization times of a preheating time tp and an afterglow time ta are calculated in S340 based on the coolant temperature THW of the coolant sensed with the coolant temperature sensor 28 in S340.

Figure 12:
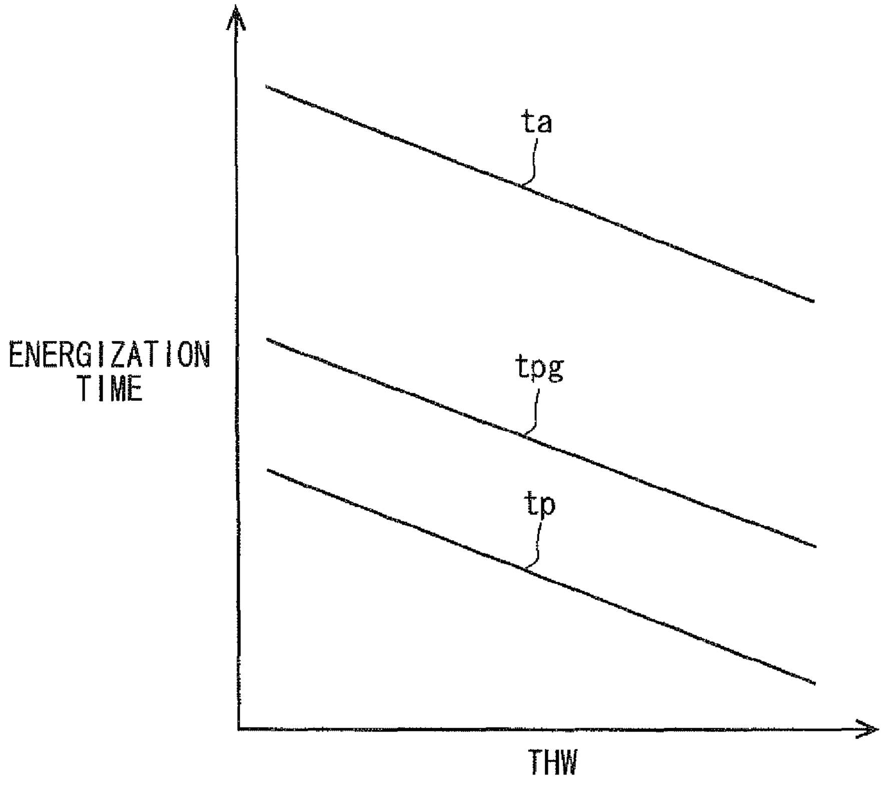
FIG. 12 is a graph showing a relationship between the coolant temperature and an afterglow time, a preheating guard time or a preheating time according to the embodiment.

As shown in FIG. 12, a relationship between the coolant temperature THW and each of the preheating time tp and the afterglow time ta is beforehand stored as a map. As shown in FIG. 101 the preheating time tp is a time necessary for the glow plugs 22 to preheat the internal combustion engine 1 until starter drive is enabled when the engine 1 is started from a cold state. The afterglow time ta is a time for energizing the glow plugs 22 even after the internal combustion engine 1 is started until the operation is stabilized.

After the times tp, ta are calculated, it is determined whether the preheating time tp has elapsed in S342. When it is determined that the preheating time tp has not elapsed (S342: NO), the process proceeds to S350. In S350, it is determined whether an operation, in which the internal combustion engine 1 rotates, is in progress. When it is determined that the operation of the engine 1 is not in progress (S350: NO), the processing of S350 and S342 is repeated until the preheating time tp elapses. When it is determined that the preheating time tp has elapsed (S342. YES), it is determined that preparation for the start has been completed and a sign such as lamp indication is switched off in S344.

Then, it is determined whether a preheating guard time tpg has elapsed in S346. As shown in FIG. 12, the preheating guard time tpg is also calculated from the map stored beforehand based on the coolant temperature THW of the coolant sensed with the coolant temperature sensor 28. Energization of the glow plugs 22 is continued until the preheating guard time tpg elapses even if the internal combustion engine 1 is not started.

When it is determined that the preheating guard time tpg has not elapsed (S346: NO), the process proceeds to S350. When the internal combustion engine 1 is started before the preheating guard time tpg elapses (S350: YES), provisional determination energization processing described later is performed in S360. Then, it is determined whether the afterglow time ta has elapsed in S370. When it is determined that the afterglow time ta has not elapsed (S370: NO), the processing of S350 and the following steps is repeated.

The energization of the glow plugs 22 of all the cylinders is terminated in S380 when it is determined that the preheating guard time tpg has elapsed (S346: YES) while the internal combustion engine 1 is not operated (S350: NO) or when the internal combustion engine 1 is operated (S350;YES) and the afterglow time ta elapses (S370: YES). Then, the provisional determination processing is ended once.

In the provisional determination processing, when the internal combustion engine 1 is operated after the preheating time tp elapses as shown in FIG. 10, the provisional determination energization processing (S360) is performed until the afterglow time ta elapses.

Figure 6:
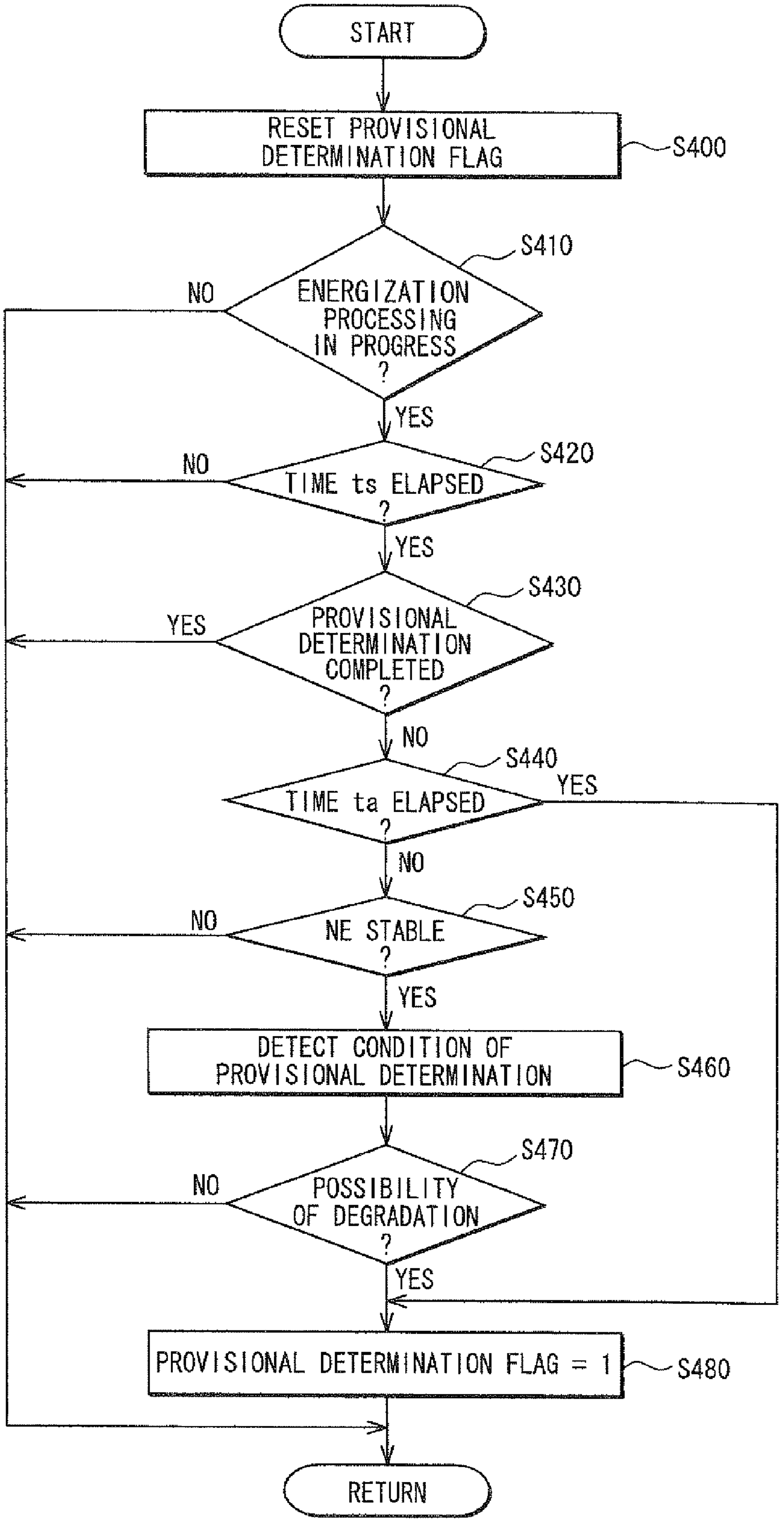
FIG. 6 is a flowchart showing an example of provisional determination energization processing performed by the ECU according to the embodiment.

Next, the provisional determination energization processing of S360 will be described with reference to FIG. 6. In the provisional determination energization processing, first in S400, the provisional determination flag is reset to 0 and then it is determined in S410 whether the energization processing of the glow plugs 22 is in progress. For example, the energization of the glow plugs 22 has been completed by the processing of S380 after the afterglow time ta elapses. Therefore, in such the case, the process returns to the original processing without performing the provisional determination energization processing (S410: NO).

Figure 13:
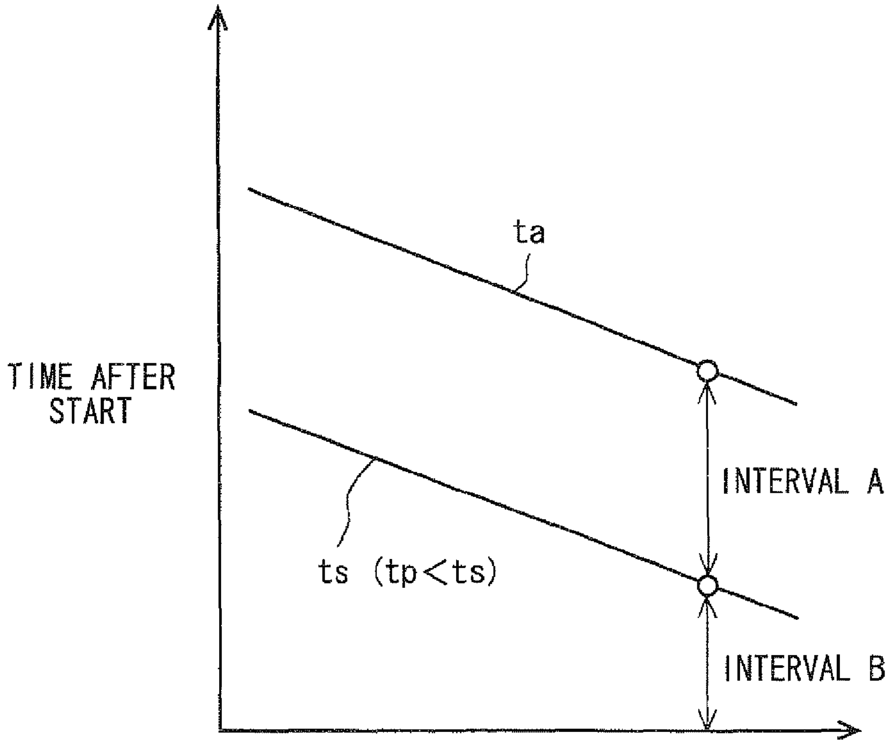
FIG. 13 is a graph showing a relationship between the coolant temperature and the afterglow time or a provisional determination start time according to the embodiment.

When the energization is in progress (S410: YES), it is determined whether a provisional determination start time ts has elapsed in S420. As shown in FIG. 13, the provisional determination start time ts is calculated from a map stored beforehand based on the coolant temperature THW of the coolant sensed with the coolant temperature sensor 28. The provisional determination start time ts is a time necessary for the temperature to be stabilized by energization of the glow plugs 22 after the internal combustion engine 1 is operated. The provisional determination start time ts is longer than the preheating time tp and shorter than the afterglow time ta. In FIG. 13 or 10, INTERVAL A represents an interval in which the provisional determination is possible. In FIG. 13, INTERVAL B represents an interval in which the provisional determination is prohibited.

The provisional determination is prohibited until the provisional determination start time ts elapses. When it is determined that the provisional determination start time ts has elapsed (S420: YES), it is determined whether the provisional determination has been completed in S430. When it is determined that the provisional determination has not been completed (S430: NO), it is determined whether the afterglow time ta has elapsed in S440.

When it is determined that the afterglow time ta has not elapsed (S440: NO), it is determined whether the rotation speed NE of the internal combustion engine 1 sensed with the rotation speed sensor 26 has been stabilized in S450. When fluctuation in the rotation speed NE is small, the operation of the internal combustion engine 1 is determined to be stable (S450: YES) and a condition for the provisional determination is detected in S460. The condition for the provisional determination according to the embodiment is the value of the current flowing through the glow plug 22 or the rotation speed NE of the internal combustion engine 1. The current value is sensed with the current detection circuit 62, and the rotation speed NE is sensed with the rotation speed sensor 26.

After the sensing, based on the result of the sensing, it is determined whether there is a possibility of the degradation of the glow plug 22 in S470. When the current value of the glow plug 22 is equal to or lower than a predetermined threshold value, it is determined that there is a possibility of the degradation of the glow plug 22. Since the internal combustion engine 1 is in operation, the glow plug 22 is cooled by the air supply, the gas exhaust or the fuel injection. Accordingly, the degradation of the glow plug 22 cannot be detected accurately. Therefore, the processing of S460 and S470 is required only to be able to determine whether there is a possibility of the degradation of the glow plug 22.

When the glow plug 22 is degraded, the fluctuation in the rotation speed NE increases. Therefore, when the fluctuation in the rotation speed NE is greater than a preset fluctuation range, it is determined that there is a possibility of the degradation of the glow plug 22.

When it is determined that there is a possibility of the degradation of the glow plug 22 (S470: YES), the provisional determination flag is set to 1 in S480. It is determined that there is a possibility of the degradation of the glow plug 22 and the provisional determination flag is set to 1 in S480 also in the case where it is determined in S450 that the rotation speed NE is not stable (S450; NO), the provisional determination energization processing is repeatedly performed, and the rotation speed NE is not stabilized by the time when it is determined in S440 that the afterglow time ta elapses (S440: YES). When it is determined that there is no possibility of the degradation of the glow plug 22 (S470: NO), the provisional determination is ended while the provisional determination flag is maintained in the initial state of 0.

It is determined whether there is a possibility of the degradation of the glow plug 22 by performing the provisional determination processing and the provisional determination energization processing. When there is a possibility of the degradation of the glow plug 22, the provisional determination flag is set to 1. When there is no possibility of the degradation of the glow plug 22, the provisional determination flag is kept at the initial state of 0.

When the above-mentioned determination processing is performed, it is determined in S110 whether the provisional determination flag is set at 1. When the provisional determination flat is set at 1 to indicate that there is a possibility of the degradation, the processing of S120 and the following steps is performed. Thus, the glow plugs 22 are energized immediately after the operation of the internal combustion engine 1 is stopped, and degradation of the glow plug 22 is accurately determined from the sensing value.

Since the provisional determination processing is performed, it is not necessary to perform the determination processing every time the operation is stopped. Accordingly, the load on the glow plugs 22 can be reduced. The provisional determination processing may be performed when necessary. The determination processing may be performed every time the operation is stopped.

In the above-mentioned determination processing and determination energization processing, energization of the glow plugs 22 is performed with the rated voltage for the preset energization time tj. Alternatively, the glow plugs 22 may be energized with an energization voltage V for an energization time tj corresponding to the coolant temperature THW of the coolant.

Figure 7:
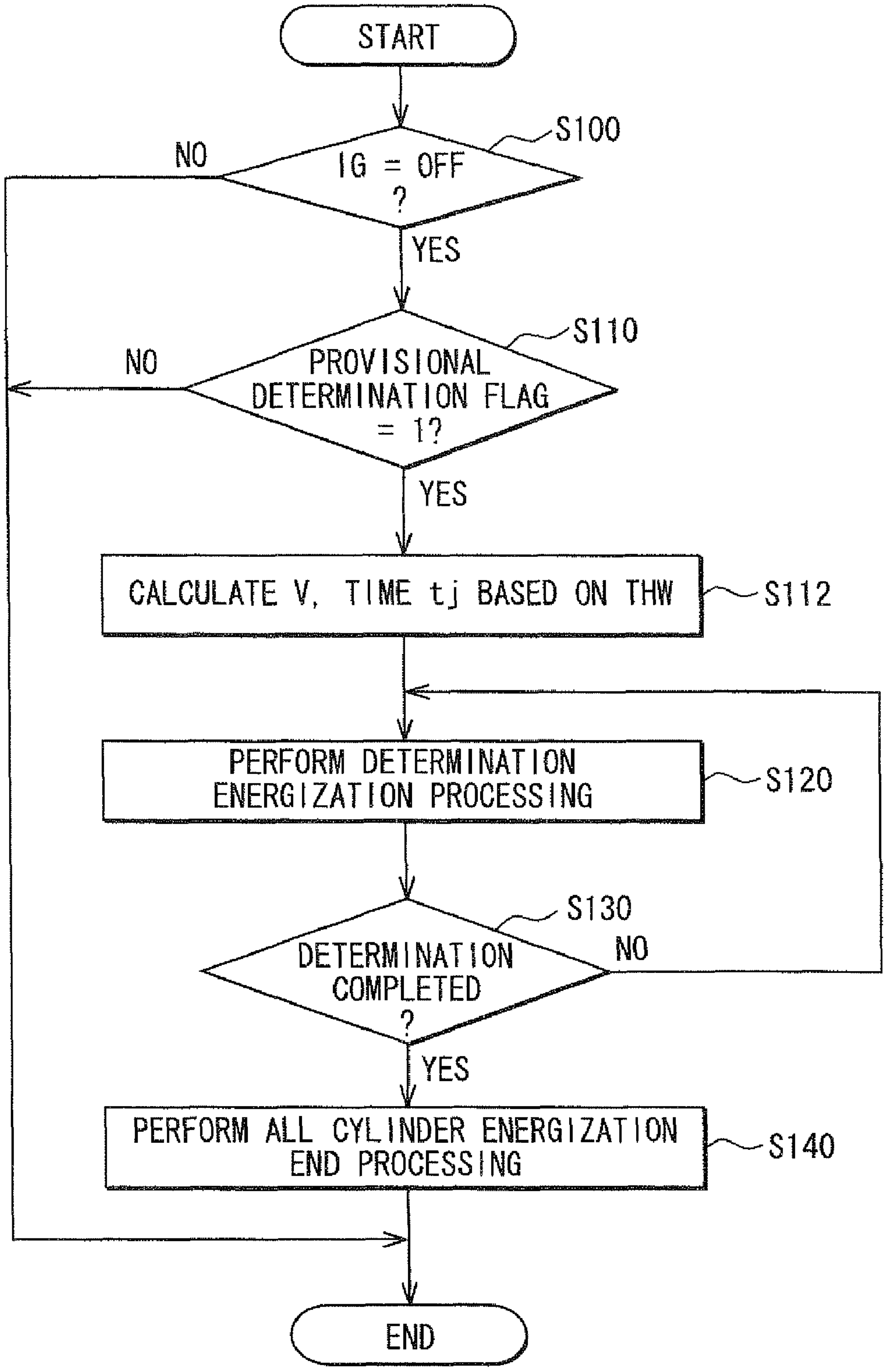
FIG. 7 is a flowchart showing another example of determination processing performed by the ECU according to the embodiment.

FIG. 7 is a flowchart showing an example of determination processing that varies the energization to the glow plugs 22 in accordance with the coolant temperature THW. The same processing as the processing in the above-mentioned determination processing will be marked with the same step number and the detailed description thereof will not be repeated below.

As shown in FIG. 7, when the provisional determination flag is set at 1 (S110: YES), the energization voltage V and the energization time tj are calculated in accordance with the coolant temperature THW sensed with the coolant temperature sensor 28 in S112.

Figure 14A:
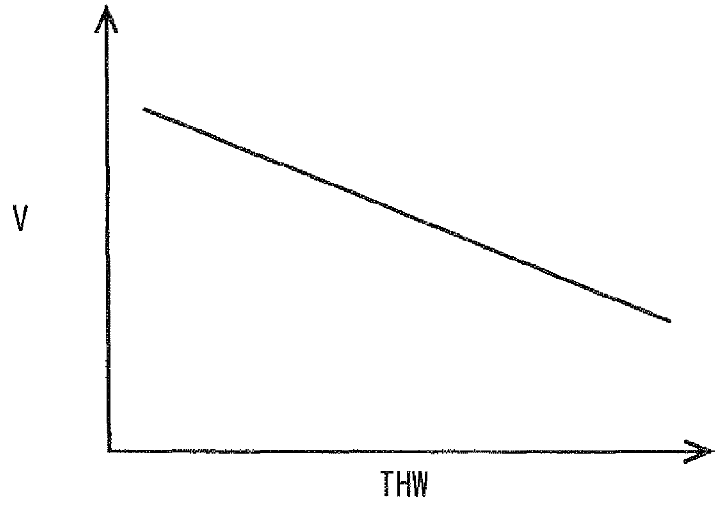
FIG. 14A is a graph showing a relationship between the coolant temperature and energization voltage according to the embodiment.
Figure 14B:
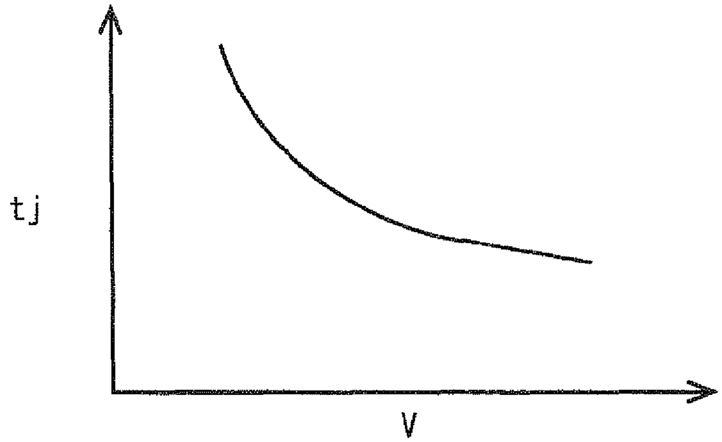
FIG. 14B is a graph showing a relationship between the energization voltage and an energization time according to the embodiment.
Figure 14C:
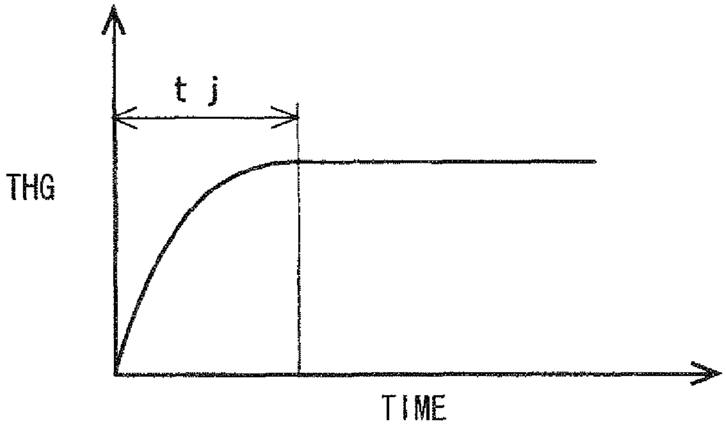
FIG. 14C is a graph showing a relationship between the energization time and the glow plug temperature according to the embodiment.
Figure 15:
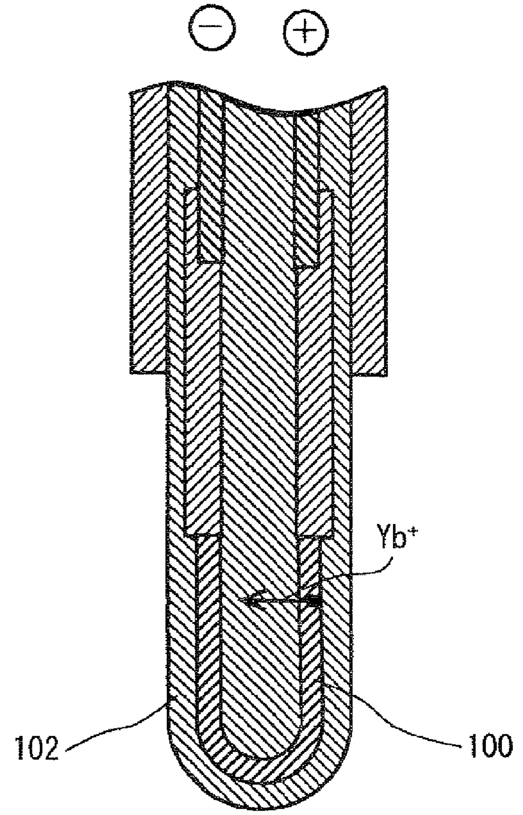
FIG. 15 RELATED ART
FIG. 15 is a cross-sectional view showing a tip of a glow plug of a related art.
Figure 16:
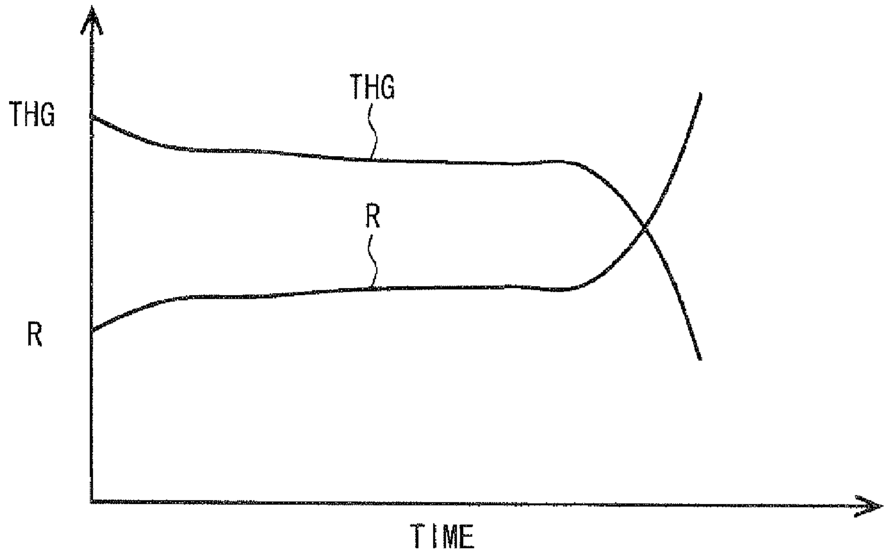
FIG. 16 RELATED ART
FIG. 16 is a graph showing temporal changes in temperature and resistance of the glow plug of the related art.

As shown in FIG. 14A, a relationship between the coolant temperature THW and the energization voltage V is stored beforehand as a map. The energization voltage V is calculated based on the sensed coolant temperature THW. As shown in FIG. 14B, a relationship between the energization voltage V and the energization time tj is stored beforehand as a map. The energization time tj is calculated based on the calculated energization voltage V. When the glow plug 22 is energized with the thus calculated energization voltage V for the thus calculated energization time tj, the temperature THG of the glow plug 22 reaches an equilibrium state when the energization time tj elapses as shown in FIG. 14C.

The determination energization processing (S120) is performed after the energization voltage V and the energization time tj are calculated as mentioned above. Thus, the glow plug 22 is energized with the energization voltage V, which is lower than the rated voltage and corresponds to the coolant temperature THW, for the energization time tj corresponding to the coolant temperature THW. Accordingly, lifetime of the glow plug 22 can be improved and the power consumption can be reduced.

In some cases, the internal combustion engine 1 is restarted shortly after the operation of the internal combustion engine 1 is stopped. If the above-mentioned determination processing is performed in each of such the occasions the lifetime of the glow plug 22 and the power consumption can be adversely affected.

Figure 8:
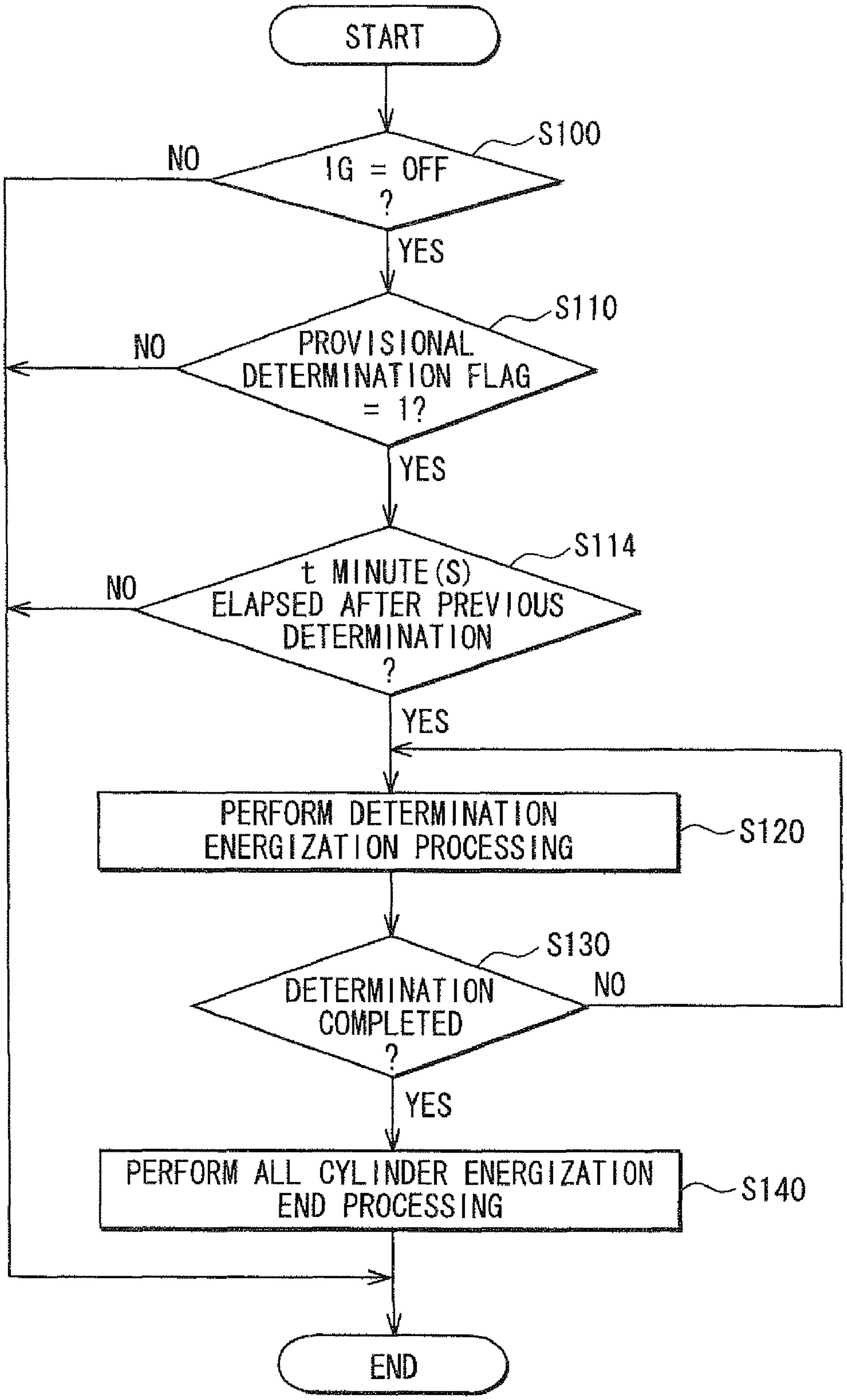
FIG. 8 is a flowchart showing yet another example of determination processing performed by the ECU according to the embodiment.

FIG. 8 is a flowchart showing an example of the determination processing of performing the determination at intervals. As shown in FIG. 8, when the provisional determination flag is set at 1 (S110: YES), it is determined in S114 whether at least t minute/minutes have elapsed after the previous execution of the determination processing.

When it is determined that at least t minute/minutes have elapsed (S114: YES), the determination energization processing is performed in S120 as mentioned above. When it is determined that t minute/minutes have not elapsed (S114: NO), the determination processing is ended once without performing the determination energization processing of S120. Thus, the lifetime of the glow plug 22 can be improved and the power consumption can be reduced.

An increasing number of vehicles perform idle stop in order to reduce emission from the internal combustion engine 1 and to improve fuel consumption of the same. If the above-mentioned determination processing is performed for each idle stop, the lifetime of the glow plug 22 and the power consumption will be adversely affected.

Figure 9:
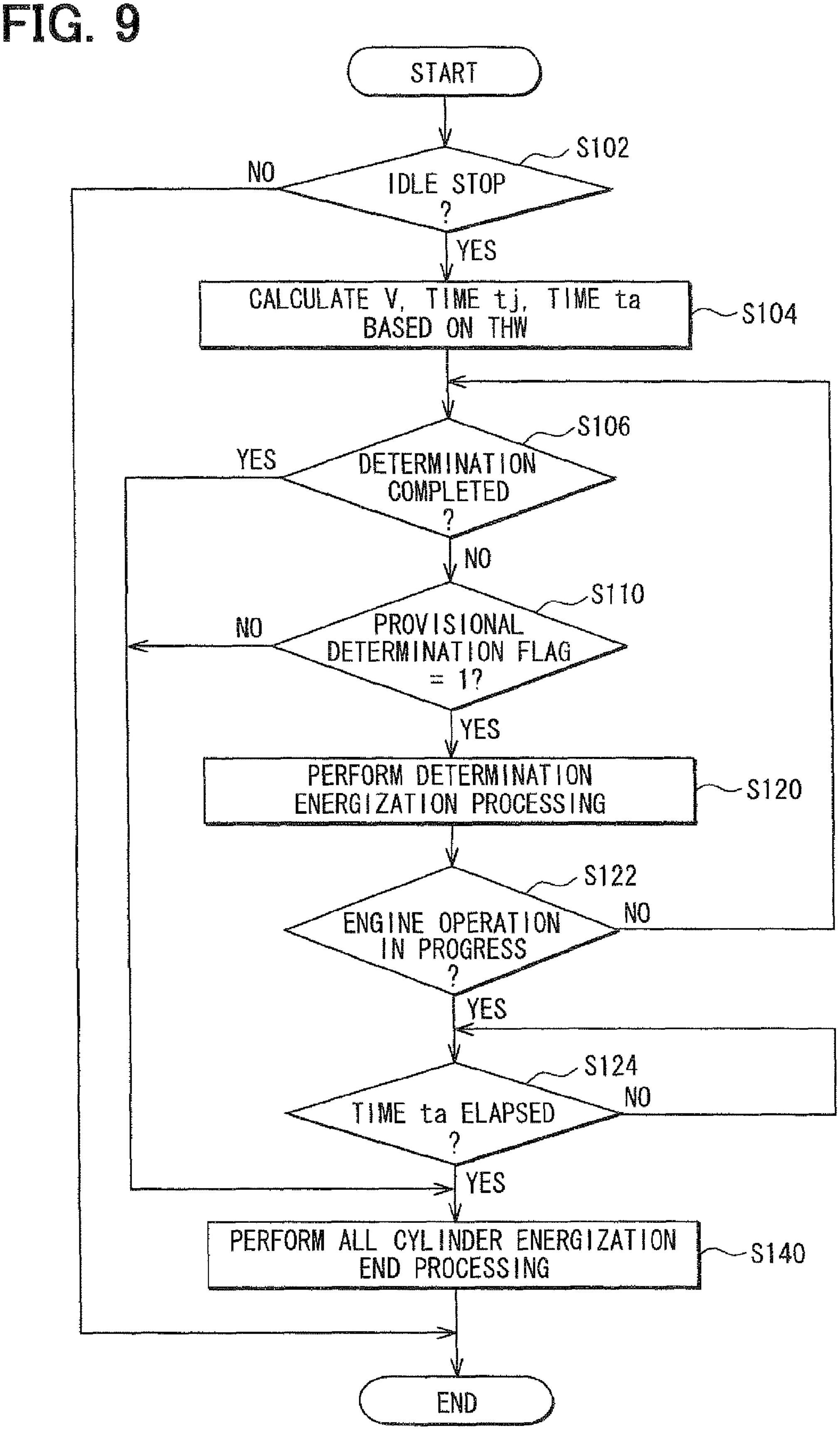
FIG. 9 is a flowchart showing a further example of determination processing performed by the ECU according to the embodiment.

FIG. 9 is a flowchart showing an example of determination processing at idle stop. As shown in FIG. 9, it is determined whether the idle stop is in progress in S102. When it is determined that the idle stop is not in progress (S102: NO), the determination processing is ended once. When it is determined that the idle stop is in progress (S102: YES), the energization voltage V, the energization time tj, and the afterglow time ta are calculated according to the coolant temperature THW sensed with the coolant temperature sensor 28 in S104.

After the calculation, it is determined whether the determination by the determination energization processing is completed in S106. When it is determined that the determination is completed (S106: YES), the processing of ending the energization of all the cylinders is performed in S140. When it is determined that the determination is not completed (S106: NO), it is determined whether the provisional determination flag is set at 1 in S110. When it is determined that the provisional determination flag is not set at 1 (S110: NO), the processing of ending the energization of all the cylinders is performed in S140. When it is determined that the provisional determination flag is set at 1 (S110; YES), the above-mentioned determination energization processing is performed in S120.

Thereafter, it is determined whether the operation of the internal combustion engine 1 is in progress in S122. When it is determined that the operation of the internal combustion engine 1 is not in progress (S122: NO), the processing of S106 and the following steps is repeated. When it is determined that the internal combustion engine 1 has been restarted and the operation thereof is in progress (S122: YES), it is determined whether the afterglow time ta has elapsed in S124.

When it is determined that the afterglow time ta has not elapsed (S124: NO), the process waits until the time ta elapses. When it is determined that the afterglow time ta has elapsed (S124: YES), the processing of ending the energization of all the cylinders is performed in S140 and the determination processing is ended.

As described above, after the determination energization processing and the degradation determination processing of the glow plug 22 are performed once in the idle stop, the determination energization processing is not performed in the repeated idle stop. Accordingly the lifetime of the glow plug 22 can be improved and the power consumption can be reduced.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A glow plug degradation determination device, comprising:

a sensing means for energizing a glow plug provided for preheating an internal combustion engine and thereby sensing a sensing value corresponding to resistance of the glow plug; and a determining means for energizing the glow plug immediately after an operation of the internal combustion engine is stopped and determining degradation of the glow plug based on the sensing value sensed with the sensing means, wherein the determining means energizes the glow plug when the internal combustion engine is stopped for idle stop and determines the degradation of the glow plug based on the sensing value sensed with the sensing means.

2. The glow plug degradation determination device as in claim 1, wherein the determining means energizes the glow plug immediately after the operation of the internal combustion engine is stopped and determines the degradation of the glow plug when a preset energization time of the energization elapses.

3. The glow plug degradation determination device as in claim 1, wherein the determining means energizes the glow plug with an energization voltage equal to or lower than a rated voltage of the glow plug.

4. The glow plug degradation determination device as in claim 1, further comprising:

a coolant temperature sensing means for sensing coolant temperature of a coolant of the internal combustion engine, wherein the determining means varies an energization voltage for energizing the glow plug in accordance with the coolant temperature sensed with the coolant temperature sensing means.

5. The glow plug degradation determination device as in claim 1, wherein when the determining means determines that the glow plug is degraded, the determining means stores a result of the determination and reports the degradation of the glow plug before a next start of the internal combustion engine.

6. The glow plug degradation determination device as in claim 1, wherein the determining means is prohibited from performing the determination until a preset time elapses after performing the determination even if the internal combustion engine is started and the operation thereof is stopped again.

7. The glow plug degradation determination device as in claim 1, further comprising:

a provisionally determining means for provisionally determining the degradation of the glow plug based on the sensing value sensed with the sensing means during the operation of the internal combustion engine, wherein after the provisionally determining means provisionally determines the degradation to be present, the determining means determines the degradation of the glow plug immediately after the operation of the internal combustion engine is stopped.

8. The glow plug degradation determination device as in claim 7, wherein the provisionally determining means performs the provisional determination when the operation of the internal combustion engine is stable.

9. The glow plug degradation determination device as in claim 7, wherein the provisionally determining means performs the provisional determination within an afterglow time.

10. The glow plug degradation determination device as in claim 9, wherein the determining means determines the degradation of the glow plug immediately after the operation of the internal combustion engine is stopped even when the provisionally determining means cannot perform the provisional determination within the afterglow time.

11. The glow plug degradation determination device as in claim 1, further comprising:

a rotation speed sensing means for sensing rotation speed of the internal combustion engine; and a provisionally determining means for provisionally determining the degradation of the glow plug based on fluctuation in the rotation speed sensed with the rotation speed sensing means during the operation of the internal combustion engine, wherein after the provisionally determining means provisionally determines the degradation to be present, the determining means determines the degradation of the glow plug immediately after the operation of the internal combustion engine is stopped.

12. The glow plug degradation determination device as in claim 1, wherein after the determining means performs the determination immediately after the internal combustion engine is stopped for the idle stop, the determining means is prohibited from performing the determination even if the operation of the internal combustion engine is stopped again.

13. A glow plug degradation determination device, comprising:

a sensing means for energizing a glow plug provided for preheating an internal combustion engine and thereby sensing a sensing value corresponding to resistance of the glow plug;

a determining means for energizing the glow plug immediately after an operation of the internal combustion engine is stopped and determining degradation of the glow plug based on the sensing value sensed with the sensing means; and a provisionally determining means for provisionally determining the degradation of the glow plug based on the sensing value sensed with the sensing means during the operation of the internal combustion engine, wherein after the provisionally determining means provisionally determines the degradation to be present, the determining means determines the degradation of the glow plug immediately after the operation of the internal combustion engine is stopped, the provisionally determining means performs the provisional determination within an afterglow time, and the determining means determines the degradation of the glow plug immediately after the operation of the internal combustion engine is stopped even when the provisionally determining means cannot perform the provisional determination within the afterglow time.

* * * * *